(12) United States Patent
Berry

(10) Patent No.: US 7,905,762 B2
(45) Date of Patent: Mar. 15, 2011

(54) SYSTEM TO DETECT THE PRESENCE OF A QUEEN BEE IN A HIVE

(76) Inventor: Jennifer Berry, Bogart, GA (US)

( * ) Notice: Subject to any disclaimer, the term of this patent is extended or adjusted under 35 U.S.C. 154(b) by 1051 days.

(21) Appl. No.: 11/711,940

(22) Filed: Feb. 28, 2007

(65) Prior Publication Data

US 2007/0207701 A1   Sep. 6, 2007

Related U.S. Application Data

(60) Provisional application No. 60/777,856, filed on Mar. 1, 2006.

(51) Int. Cl.
*A01K 47/06* (2006.01)
(52) U.S. Cl. .......................................... 449/3; 340/573.2
(58) Field of Classification Search .................. 449/2, 3, 449/8, 21, 28; 340/539.14, 573.2; 324/326
See application file for complete search history.

(56) References Cited

U.S. PATENT DOCUMENTS

| | | | | |
|---|---|---|---|---|
| 3,896,371 A * | 7/1975 | Hametta | ....................... | 324/327 |
| 4,486,712 A * | 12/1984 | Weber | ........................... | 324/329 |
| 5,059,951 A * | 10/1991 | Kaltner | ........................ | 340/572.3 |
| 5,134,370 A * | 7/1992 | Jefferts et al. | ............... | 324/247 |
| 6,819,109 B2 * | 11/2004 | Sowers et al. | ................ | 324/329 |

* cited by examiner

*Primary Examiner* — Rob Swiatek
(74) *Attorney, Agent, or Firm* — Clements Bernard PLLC; Gregory N. Clements

(57) ABSTRACT

A system to detect the presence of a queen bee in a hive. The first system includes an RFID (radio frequency identification) tag (secured to the queen) and a RFID detection device secured adjacent the hive opening that sends an output that indicates the presence or absence of the queen bee. In a second embodiment, a bit of metal (thin foil) can be secured to the queen by means of an adhesive, and a metal detector can be positioned by the hive opening to detect the metal, and send an output that indicates the presence or absence of the queen bee. In a third embodiment, one or more infrared cameras can be positioned adjacent the hive entrance, coupled with detection scanning software that can detect the difference between a drone, a worker and a queen bee, and indicate the presence or absence of the queen bee.

10 Claims, 4 Drawing Sheets

SYSTEM TO DETECT THE PRESENCE OF A QUEEN BEE IN A HIVE

This patent application claims the benefit of applicant's provisional patent application filed Mar. 1, 2006, under Ser. No. 60/777,856.

BACKGROUND OF THE INVENTION

1) Field of the Invention

The present invention is a system to detect the presence of a queen bee, particularly a queen honeybee, in a hive. Different alternative forms of the invention are disclosed. The first system includes an RFID (radio frequency identification) tag (secured to the queen) and a detection device that detects the RFID tag (secured to the hive opening, for example) and sends or records an output that can be interpreted as indicating the presence or absence of the queen bee. Alternatively, in a second embodiment of the present invention, a bit of metal (thin foil) can be secured to the queen by means of an adhesive, for example, and a metal detector can be positioned by the hive opening to detect the metal, and send or record an output that can be interpreted as indicating the presence or absence of the queen bee. Lastly, in a third embodiment of the present invention, one or more infrared cameras can be positioned adjacent the hive entrance, coupled with computer identification scanning software that can detect the difference between a drone, a worker and a queen bee, and indicate the presence or absence of the queen bee. In each case the output signal can be as simple as a light that is illuminated and/or an antenna that allows the signal to be transmitted remotely. The system may also include a portable hand wand that will detect the location of a queen within a hive.

2) Prior Art

During the main honey flow, it is not unusual for a single beehive to have 60,000 bees. Most of the bees will be workers, perhaps a few thousand may be drones, but there is normally only one queen bee. Therefore, when it is time to find the queen, it can be very difficult to find 1 in 60,000.

After a queen has been mated, she rarely leaves a hive on her own accord. But if the queen leaves a hive, it usually occurs in the spring with a swarm of other bees from the hive, leaving behind some bees and a few queen cells to enable the existence of the original hive. The queen and swarm create a new hive elsewhere. Other times a queen dies from disease, or pests or accidental killing by the beekeeper when manipulating the hive. If she dies in the hive, the worker bees will remove her from the hive.

It is important to know if a queen is no longer in a hive and to make plans to replace her as soon as possible. This helps insure that the continued existence of the hive. Sometimes it is enough to know if the queen is in the hive, i.e., she did not swarm, or has not died, and other time it is important to know where the queen is in the hive, to replace her, for example, when she has aged out.

Commercial beekeepers may have thousands of hives. Trying to either determine if the queen is in the hive or find the queen in each hive takes time and is labor intensive. Hobby beekeepers have only a few hives, but generally are slower to find the queen bee because of lack of experience. Both groups could benefit from a system that: 1) detects if a queen bee is in a hive, and/or 2) determines the specific location of the queen in the hive. Furthermore, commercial beekeepers could additionally benefit from such a system if it could send the output signal to a remote location.

SUMMARY OF THE INVENTION

An object of the present invention is to at least detect the presence of a queen within a hive and a further object is to locate the queen in the hive.

Another goal of the invention is to signal the presence of the queen in the hive so that merely viewing the hive will be sufficient to observe an output signal, such as an alert lamp.

It would also be desirable to be able to detect from a remote location the presence of the queen in the hive. Therefore a further refinement would be to send a signal from the hive to a remote device, for example, that alerts someone if the queen is present or if she has left the hive.

The best advantages of the invention comprise detecting the presence or absence of the queen in a hive, having an observable output signal located on the hive, and means to send a signal to a remote location. Optionally these advantages can also include a device to detect the location of the queen within the hive, by using a hand wand.

In the broadest and simplest sense, the invention comprises several embodiments, namely: 1) an RFID tag secured to the queen, a detector positioned near the opening of the hive that detects the presence of the RFID tag when the queen passes through the opening, and a signal device (like an LED) to indicate if the queen has left the hive or is in the hive; 2) another embodiment comprises a bit of metal secured to the queen, a metal detector positioned near the opening of the hive that detects the presence of the metal on the queen when she passes through the opening, and a signal device to indicate if the queen has left the hive or is in the hive; and 3) another embodiment comprises one or more infrared cameras positioned adjacent the hive entrance, coupled with computer identification scanning software that can detect the difference between a drone, a worker and a queen bee, and a signal device to indicate if the queen has left the hive or is in the hive.

In the broadest sense, the invention also comprises an RFID tag/bit of metal secured to the queen, a detector near the opening of the hive that detects the presence of the RFID tag/bit of metal when it is near the hive opening, and an output signal device to pick-up from the detector the presence of the RFID tag/bit of metal, the signal device which may be a simple LED to indicate if the queen has left the hive or is in the hive. Optionally, the invention may include an antenna to remotely send the detector output signal to a receiver, and the receiver to indicate if the queen has left the hive or is in the hive.

In the broadest sense, the invention also comprises an RFID tag/bit of metal secured to the queen, a detector near the opening of the hive that detects the presence of the RFID tag/bit of metal when it is near the opening, and a signal device to indicate if the queen has left the hive or is in the hive, and a hand wand detector to determine the location of the queen in the hive, if she is present.

In the broadest sense, another embodiment of the invention also comprises one or more infrared cameras positioned adjacent the hive opening that, when coupled with scanning software, can identify the queen when she passes through the opening and a signal device to indicate if the queen has left the hive or is in the hive.

In the broadest sense, the invention may be an RFID tag/bit of metal adapted to be secured to the queen bee, and a hand held wand to detect the RFID tag or the bit of metal to locate the queen within the hive.

In the broadest sense, the invention may be a handheld wand with an infrared camera and detection circuitry with software built in. As the user passes the hand wand over each frame within a hive, the software would compare the stored image or images of a queen bee, to that generated by the infrared camera that "sees" the heat given off by a queen bee and creates an image. When there is a match between the image created by the camera and the stored software, the wand would generate a signal such as a light bulb, or a vibration, or a sound, or a combination thereof. In this broad scope of the invention, only the hand held wand is needed.

BRIEF DESCRIPTION OF THE DRAWINGS

A description of the embodiments of the present invention briefly summarized above may be had by reference to the embodiments, which are shown in the drawings that form a part of the detailed specification. These drawings illustrate certain preferred embodiments and are not to be used to improperly limit the scope of the invention (beyond that of the appended claims), which may have other equally effective and legally equivalent embodiments.

DESCRIPTION OF THE PREFERRED EMBODIMENTS

Figure 1:
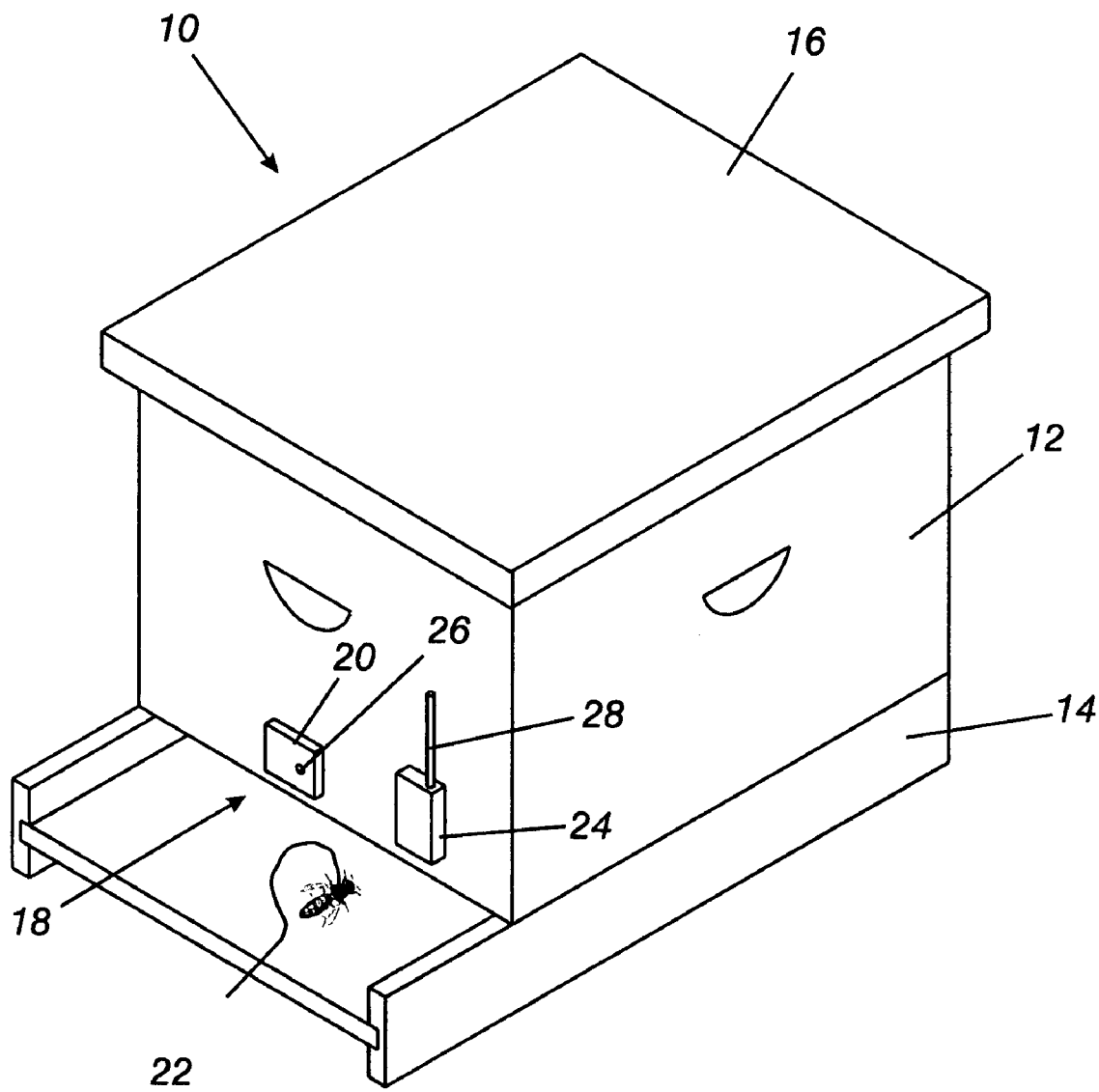
FIG. 1 is a perspective view of a beehive illustrating a RFID detector and a queen bee with an RFID tag.

Beehives are well known and their construction and materials employed form no part of the present invention. As illustrated in FIG. 1, a beehive 10 comprises a hive body 12 that typically sits on a base 14 that is longer than the have body so as to form a platform for the bees to land and take-off. An opening 18 provides ingress and egress to the hive. Lastly, the hive body is covered with a weather resistant cover 16.

RFID tags are well known. A queen bee is shown on the platform and has an RFID tag 22 secured to her thorax by an adhesive. Likewise, RFID detectors 20 are also well known. The RFID detector 20 is capable of detecting any bee that has an RFID tag secured to it. While the RFID detector 20 is shown as being smaller than the opening, it is within the scope of the invention to make it substantially as long as the opening 18 to improve its efficiency in detecting the queen. The detector includes a power source, such as batteries, not shown, to power the detector. Associated with the detector 20 is a light source 26, such as an LED type. Connected to the detector 20, or spaced from it is a receiving/sending unit 24 that includes an antenna 28. The power source that powers the detector may also power the receiving/sending unit 24, or it may have its own power source.

Figure 4:
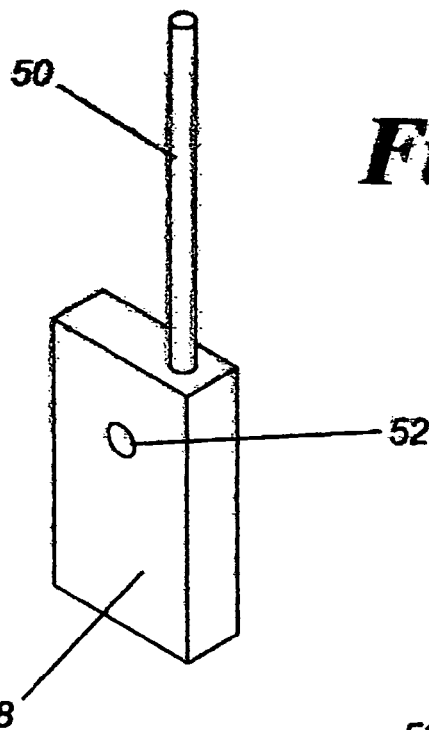
FIG. 4 is a schematic view of a remote receiver to receive signals from the beehive.

When a queen bee having an RFID tag secured to her body passes through the opening 18 (from inside the hive body 12 to the outside), the detector 20 detects the presence of an RFID device and sends a signal to the light source 26 causing it to glow. So if an LED is glowing, the queen bee passed through the opening 18. If the queen bee passes back into the hive 10, then the detector 20 would again detect the RFID tag and send another signal to the LED, turning it off. Thus, the simplest form of the invention is just to have the detector and the RFID tagged queen. Optionally a unit 24 that receives the signal from the detector 20 sends the same or similar signal to a remote device 48 (see FIG. 4) via antenna 28. A person seeing the hive can determine if the light is on or off. If the unit 24 is present, and the beekeeper has a corresponding remote device 48, antenna 50 receives the signal from unit 24 and a light source 52 on the remote device turns on—glows—and alerts the beekeeper. Thus the beekeeper does not have to see the hive to determine if the queen is present. The remote device can be powered by alternating current, for example, or by battery. While a visual effect (the LED) has been described, any type signal could be used such as sound, vibration, or a combination of these. However LED uses very little power from a battery and therefore it makes an ideal device for this purpose.

Figure 2:
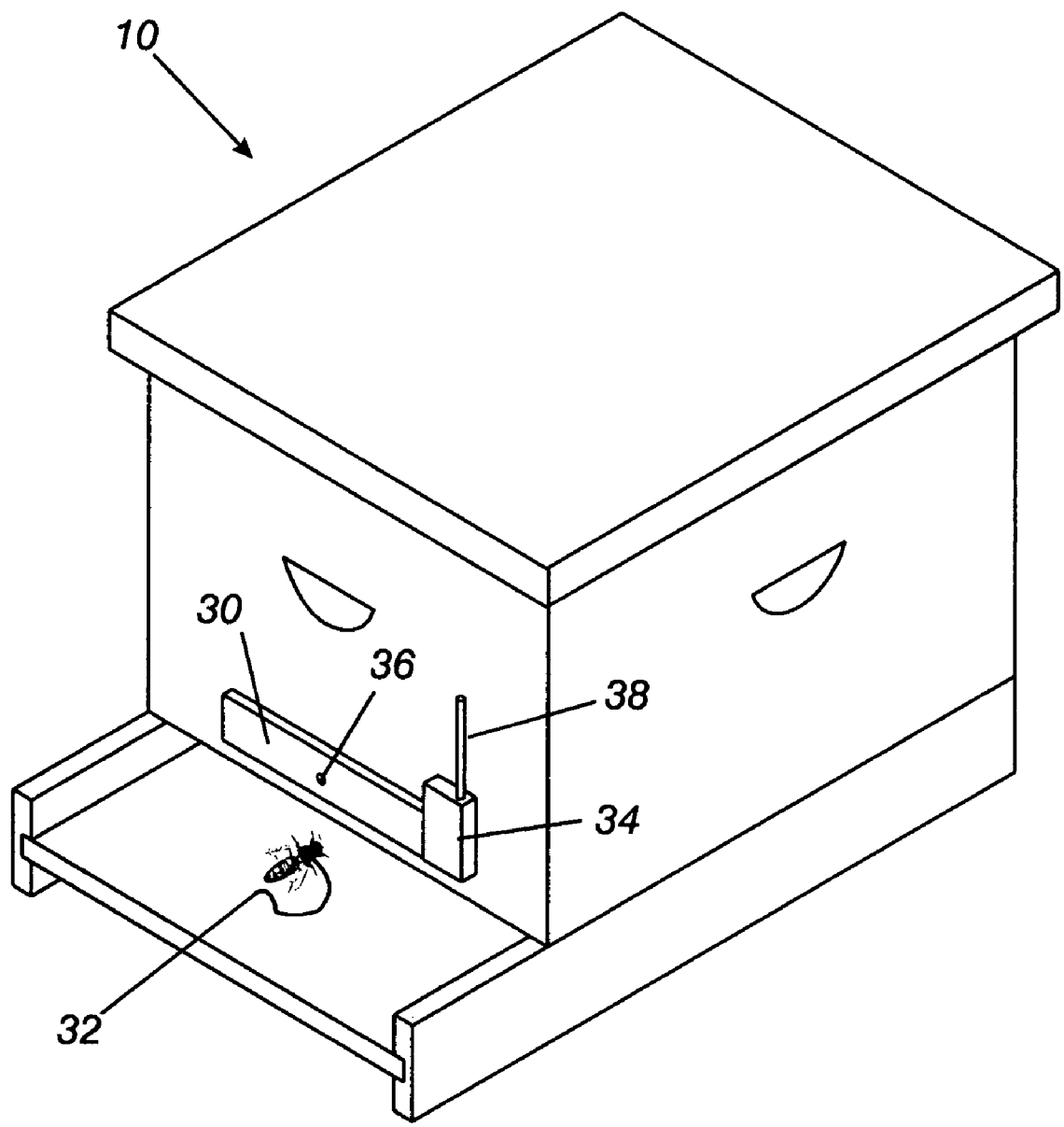
FIG. 2 is a perspective view of a beehive illustrating a metal detector and a queen bee with a bit of metal secured to her back.

As illustrated in FIG. 2, another embodiment of the invention is shown, wherein a metal detector 30 is depicted. The size of the metal detector is well within the skill of the artisan, such that the entire opening 18 is well covered. A queen bee having a bit of metal 32 on her thorax triggers the detector 30 when the queen passes thru opening 18, thus enabling the detector to detect the metal 32. The detector 30 must be secured to the hive body without using nails or screws that would trigger the metal detector 30. The detector 30 includes a light source 36, such as an LED, which operates or functions in the same manner as light source 26. Adjacent the detector 30 (as shown in FIG. 1), or as an integral part of the detector 30 (FIG. 2), is a receiving/sending unit 34 with an antenna 38. The unit 34 receives any signal from the detector 30 and sends that signal, via antenna 38 to a remote device 48 (FIG. 4), via its antenna 50. Any signal received by the remote device 48 triggers light source 52. This receiving and sending unit and the various light sources function in the same manner as previously disclosed with the FIG. 1 device, and with the same options (light versus sound, versus vibration, or a combination). Like the FIG. 1 device, the receiving/sending unit 34 is optional, if one desires only the simplest form of the invention.

Figure 3:
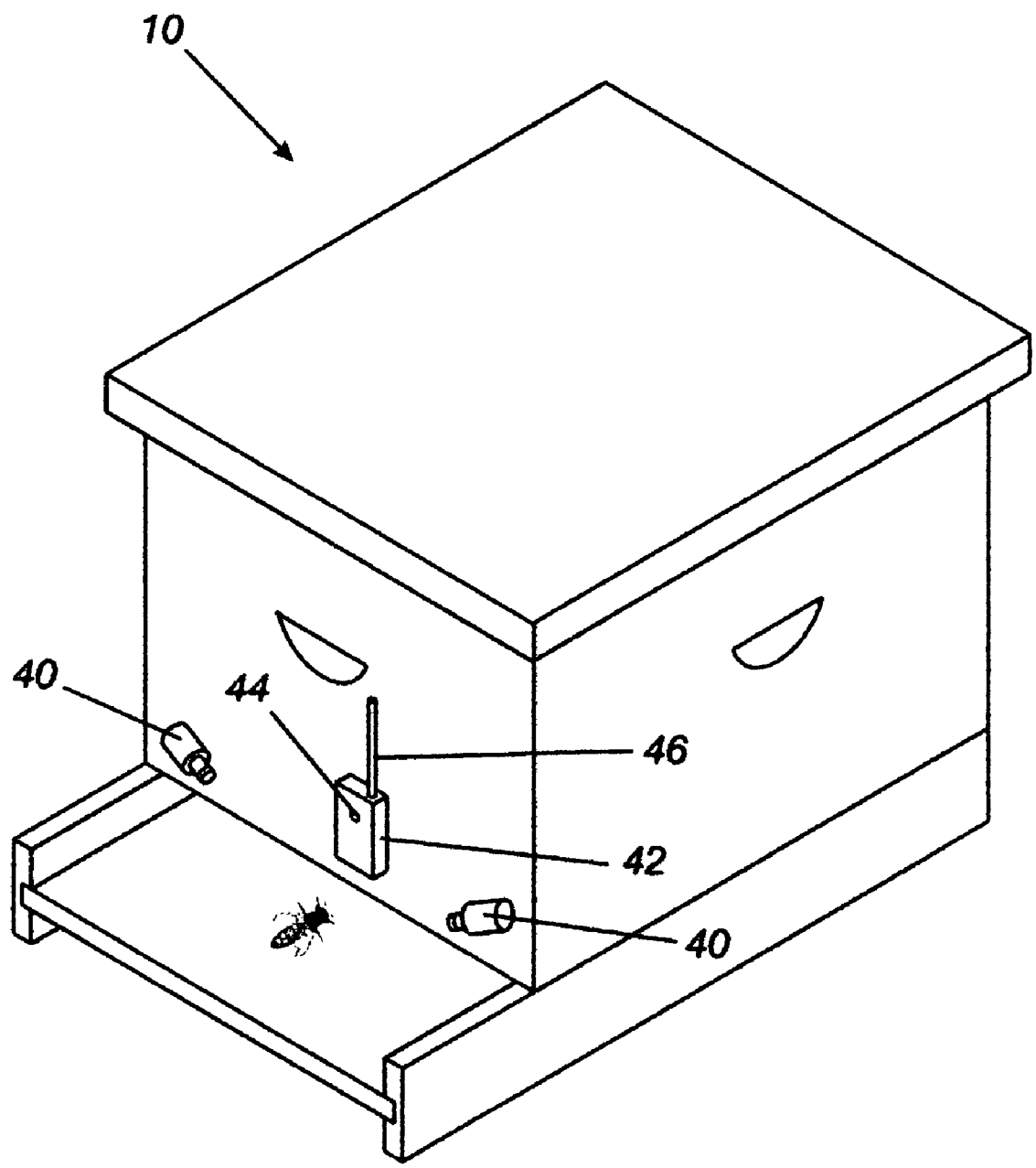
FIG. 3 is a perspective view of a beehive illustrating at least one infrared camera and housing containing software to detect a queen bee that appears before the camera.

FIG. 3 illustrates another embodiment of the invention. Attached to beehive 10 is at least one infrared camera 40. The exact number of cameras employed to obtain good coverage of the opening 18 is determinable by the skilled artisan. Also attached to the hive body 12 is detector/scanning software 42 that is capable of determining the shape of any bee based on its body heat that is constantly being released to the environment. Thus the infrared camera 40 detects the body heat of any bee passing through opening 18, which in turn generates an image that the detector/software 42 compares to stored images of a queen bee. When there is a match between the camera image and the stored images within the software, a signal is sent that turns on light source 44, indicating that a queen bee has passed through the opening of the hive. If the queen bee should return to the hive, the software would detect this and send another signal turning off the light source 44. Optionally the detector 42 may include an antenna 46 to send a signal to a remote device 48, which is received via antenna 50. Any signal received by the remote device 48 triggers light source 52 as previously disclosed. The detector/scanning software 42 may be powered by batteries, for example. However if alternating current is available, all the detector devices may be powered the alternating current. Again the light source could be replaced with a sound device or a vibrating device, or a combination of these. Also the light source is preferably an LED, but other types are also within the scope of the invention.

Remote device 48 may take the form of various pieces of equipment. For example, it could be a computer, a cell phone, or just a simple receiving unit to receive the signal that in turn turns on a light source, a sound device, a vibration, or a combination of these. If a computer or cell phone is the remote device, a stored message could be triggered by the signal, and the message would appear on the computer or cell phone screen.

Figure 5:
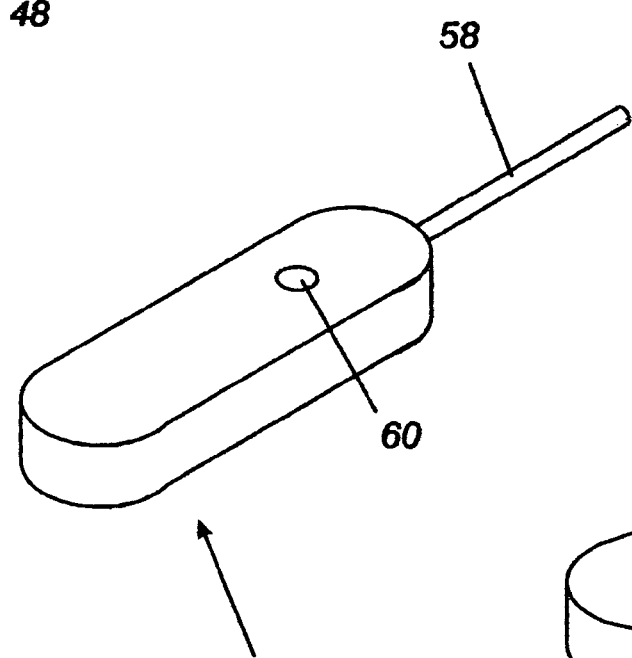
FIG. 5 is a perspective view of a handheld wand for detecting a queen bee having an RFID tag or a bit of metal.

Sometimes it is important to know where the queen is within the hive to replace her, for example, when she has aged out. It is difficult to find the queen bee, especially when the hive is full of bees. The present invention may optionally include a hand wand 56 as shown in FIG. 5. The hand wand would have detection circuitry built-in with a directional antenna 58 to narrow the scanned area to the size of a quarter, for example. Depending on whether the queen with the RFID tag or with the bit of metal is positioned within the hive, the circuitry would detect the queen when the hand wand is passed over each frame within the hive 10. The hand wand would then signal the user via a light source 60 or another alternate means such as by sound or vibration, that the queen bee has been detected near where the antenna 58 is pointed. When the hand held wand is the metal detector type, it will be important to note if any nails were used in constructing the frames within the hive. These nails could give false signals. So either the location of the nails used to construct the frame should be known, of the frames should be constructed without using nails, screws, or staples. This can be easily overcome as there are all plastic frames in the marketplace.

Figure 6:
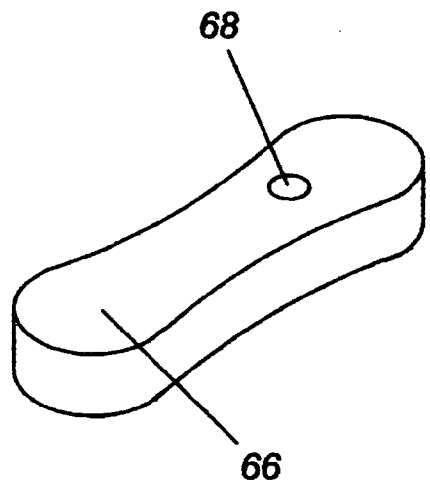
FIG. 6 is a handheld wand having a built-in infrared camera that also includes software therein for detecting a queen bee.

For the embodiment illustrated in FIG. 3 using infrared cameras and software, the hand wand 66 shown in FIG. 6, may be employed. The hand wand 66 has an infrared camera 68 and the detection circuitry with software is built in, such that as the user passes the hand wand over each frame within a hive 10, the software would compare the stored images of a queen bee to that generated by the infrared camera and when there is a match, the software would generate a signal such as a light bulb (not shown), or a vibration, or a sound, or a combination thereof.

The simplest embodiments of the present invention comprise an RFID tag/bit of metal secured to the queen, a detector near the opening of the hive that detects the presence of the RFID tag/bit of metal when it is near the opening, and a detector output signal device (LED, for example) to indicate if the queen has left the hive or is in the hive. Securing a RFID tag/bit of metal to a queen may be accomplished by use of glue or adhesive cement, for example. It is within the scope of the present invention that the range of detection devices can be manually adjusted. It may be necessary to have a couple of detection devices depending on the size parameters of the opening. Connected to the detector may be a simple LED light that can be seen from outside the hive. The detector and LED light can be battery powered. Alternatively, any type of visual light or audio sound or vibration can be employed in place of the LED light.

Once the detector is properly installed on the hive and the RFID tag/metal is secured to the queen, and the queen is placed in the hive, if the queen passes through the opening, the RFID/metal detector senses the presence of the RFID tag/metal and it triggers the LED light to illuminate. If the queen returns to the hive, the detector again senses the RFID tag/metal and turns the LED light off. Because RFID tags/detectors are capable of operating within a range of outputs, each queen may have a tag that is unique to her (a single output per tag). Thus RFID tags have an advantage over metal detectors, with a queen properly tagged with either an RFID tag or a bit of metal, a beekeeper can now walk into his/her apiary and look for any illuminated LED lights. An illuminated LED light means the queen is not present and the beekeeper must take action, if the condition persists, such as replace the queen, or combine that hive with another hive having a queen.

The simplest embodiments of the invention can be upgraded to also include a hand wand detector. When it is time to replace a queen bee, because she is old or sick, or the beekeeper merely wants to try another type of honeybee, a hand wand that detects all frequencies of RFID tags/or metal is a great aid. The beekeeper opens the hive and removes each frame individually. The hand wand is waved over both sides of each frame successively until a buzzer or light associated with the wand indicates the presence of the queen. It is then a simple matter to remove that queen and replace her with another queen having the proper RFID tag or bit of metal securely positioned.

The present invention also includes the ability to incorporate a receiving/sending unit with an antenna and send the detector output signal to a remote location. This feature is especially useful to a commercial beekeeper because he/she typically has many apiary sites located over a broad region. So the detector may have the LED light, but with an antenna, it can transmit the same detector output signal associated with the LED light to the antenna, and broadcast that to a remote receiver. The remote receiver can also signal the presence or absence of the queen in a specific hive. The beekeeper can then take corrective action as mentioned previously.

A slightly more complex form of the invention is the use of at least one infrared camera to detect the body heat of a bee, create an image of that and, using software, compare that image to other stored images of queen bees. When the software finds a match, a queen bee has been detected as she passed through the opening of the hive. The software can generate a signal when this happens that turns on an LED, for example or sends a signal to a remote device that likewise has a corresponding LED.

Thus the aims, objects and advantages of the present invention described above can be understood by those skilled in the art, and the aims, objects and advantages are claimed as set forth below. Those skilled in the art realize that many modifications and alterations of the present invention can be made without departing from the scope and boundaries thereof.

What is claimed is:

1. A hive for honeybees, comprising: a hive body, a base upon which said hive body sits in such a manner as to create an opening into said hive, a cover to cover the hive body, and a system to detect the presence or absence of a queen bee in said hive, comprising a radio frequency identification (RFID) tag adapted to be secured to the queen, a detector for detecting the RFID tag when it is within range, and an output signal from the detector to indicate the presence or absence of a queen bee in a hive, wherein said detector is positioned on the exterior of said hive body adjacent said opening.

2. The hive of claim 1, wherein the output signal is connected to: a light emitting diode (LED), whereby the LED is illuminated if the queen bee is not present and off if the queen bee is present; or a sound device, whereby the sound device is audible if the queen is not present and silent if the queen is present; or a vibration device, whereby a vibration is easily felt if the queen is not present and no vibration is felt if the queen is present.

3. The hive of claim 1, further including a hand wand detector for detecting the location of a queen within the hive, if present, by detecting said RFID tag.

4. The hive of claim 1, further including a receiving/sending unit for receiving a signal from said detector and for sending the output signal to a remote device.

5. A hive for honeybees, comprising: a hive body, a base upon which said hive body sits in such a manner as to create an opening into said hive, a cover to cover the hive body, and a system to detect the presence or absence of a queen bee in said hive, comprising a bit of metal adapted to be secured to the queen, a detector for detecting the metal when it is within detection range, and an output signal from the detector to indicate the presence or absence of a queen bee in a hive, wherein said detector is positioned on the exterior of said hive body adjacent said opening.

6. The hive of claim 5, wherein the output signal is connected to: a LED, whereby the LED is illuminated if the queen bee is not present and off if the queen bee is present; or a sound device, whereby the sound device is audible if the queen is not present and silent if the queen is present; or a vibration device, whereby a vibration is easily felt if the queen is not present and no vibration is felt if the queen is present.

7. The hive of claim 5, further including a hand wand detector for detecting the location of a queen within the hive, if present, by detecting the presence of metal.

8. The hive of claim 5, further including a receiving/sending unit for receiving a signal from said detector and for sending the output signal to a remote device.

9. A system for finding a queen bee within a hive, comprising: a hive body, a base upon which said hive body sits in such a manner as to create an opening into said hive, a cover to cover the hive body, an RFID tag adapted to be secured to a queen bee, and a hand held wand detector for locating said RFID tag, wherein said wand detector also includes a signal output that informs the user that said RFID has been located.

10. A system for finding a queen bee within a hive, comprising: a hive body, a base upon which said hive body sits in such a manner as to create an opening into said hive, a cover to cover the hive body, a bit of metal adapted to be secured to a queen bee, and a hand held wand detector for locating said bit of metal, wherein said wand detector also includes a signal output that informs the user that said bit of metal has been located.

* * * * *